E. MORRIS.
HINGE JOINT FOR LOCKETS, &c.
APPLICATION FILED FEB. 29, 1908.
939,530.
Patented Nov. 9, 1909.
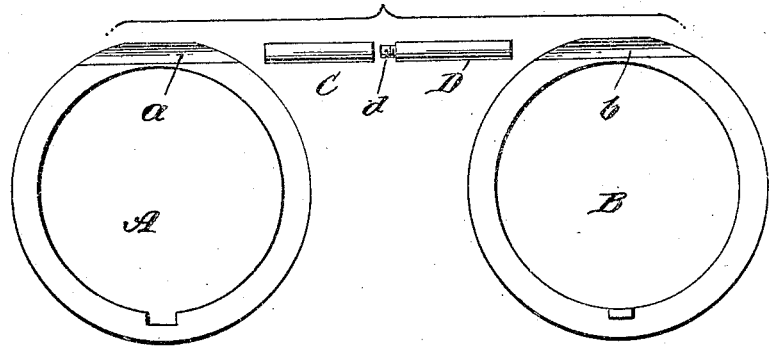
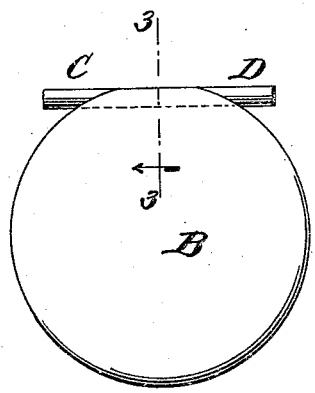
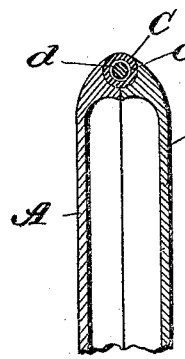
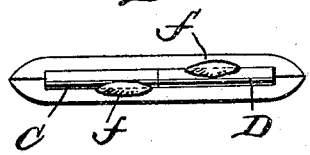
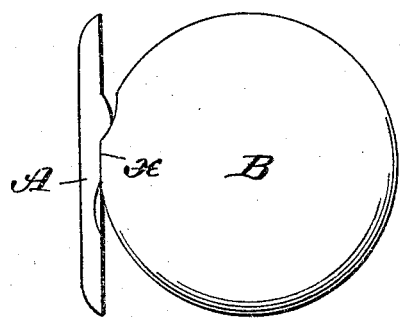
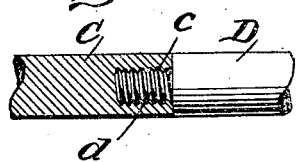
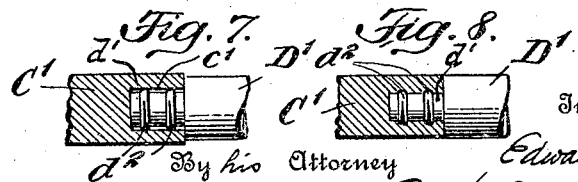
Witnesses
Inventor
Edward Morris
By his Attorney

UNITED STATES PATENT OFFICE.

EDWARD MORRIS, OF NEWARK, NEW JERSEY, ASSIGNOR TO THE SHIMAN MILLER MANUFACTURING COMPANY, OF NEW YORK, N. Y., A CORPORATION OF NEW YORK.

HINGE-JOINT FOR LOCKETS, &c.

939,530.

Specification of Letters Patent.

Patented Nov. 9, 1909.

Application filed February 29, 1908. Serial No. 418,422.

*To all whom it may concern:*

Be it known that I, EDWARD MORRIS, a citizen of the United States, and a resident of Newark, Essex county, and State of New Jersey, have invented certain new and useful Improvements in Hinge-Joints for Lockets, &c., of which the following is a specification.

This invention relates to an improved hinge joint for lockets and similar articles. The invention may also be employed for forming a hinge joint between two members to be used for any other purpose.

Broadly the invention comprises a pintle formed in two parts having a swivel connection with each other, one part being secured to one member and the other part to the other member.

In the accompanying drawing I have illustrated one preferred form of my invention in connection with a locket, and in such drawing: Figure 1 shows in plan the two halves of a locket and the two parts of the pintle. Fig. 2 is a side view of the locket showing the pintle in position to be secured to the two halves of the locket. Fig. 3 is a section on the line 3—3 of Fig. 2. Fig. 4 is an edge view of the hinge joint showing in exaggerated form the solder for securing the respective halves of the locket to the respective parts of the pintle. Fig. 5 is a view of the locket in an open position showing the external appearance of the hinge joint when completed. Fig. 6 is a view partly in section, showing the two parts of the pintle when connected to each other. Figs 7 and 8 illustrate a modification.

The two halves of the locket are indicated by A and B and the two parts of the pintle by C and D. The half A has a transverse groove *a* formed in it adjacent to the periphery and the half B has a similar groove *b* formed in it. Preferably these grooves will be substantially alike as to length and depth and when the two halves are fitted together, they will form a semi-cylindrical bore, open at the edge of the locket, and of a diameter to receive the pintle with a tight sliding fit. In practice, the two halves of the locket will be held in proper relation to each other by a temporary clamping device and while so held the pintle will be inserted in the semi-cylindrical bore as shown in Fig. 2 and then one part of the pintle will be secured to one-half of the casing by solder or otherwise and the other part of the pintle to the other half of the locket in a similar manner. In Fig. 4, the solder is indicated by *f* in an exaggerated form. After the two parts of the pintle have been secured to the respective halves of the locket, the end portions of the pintle which project beyond the periphery of the locket will be cut off and the exposed portions of the pintle will be filed or otherwise shaped to conform to the shape of the edge of the locket and when properly finished the hinge joint will hardly be perceptible on the exterior of the locket. The appearance of the joint when the locket is opened is shown in Fig. 5 and it will be observed that a lip *x* on the half B will engage the other surface of the half B and act as a stop to prevent the two parts opening more than at an angle of about ninety degrees.

The swivel connection between the two parts may be formed in many ways, but for the particular purpose illustrated, I prefer to provide one part with a threaded bore, as at *c*, and the other part with a reduced and threaded end portion as *d*, to fit in the bore. With such a construction when the locket is opened the two parts of the pintle will turn relatively to each other a quarter of a revolution and the two parts C and D will move slightly away from each other, and when the locket is closed the two parts of the pintle will resume their normal positions such as shown in Fig. 6.

In Figs. 7 and 8, I have illustrated another way of making a swivel connection between the two parts of the pintle. Here the part C′ is of slightly greater diameter than the part D′ and of softer metal, and is provided with a bore *c′*. The part D′ has a shouldered and reduced end *d′* provided with two or more circumferential ribs $d^2$ which are of the same diameter as the bore *c′* so as to make a tight sliding fit. After the part *d′* is inserted into the bore the pintle is forced through a swaging die and the softer metal of the part C′ will be forced in about the ribs $d^2$ as shown in Fig. 8. This will effectually prevent endwise movement between the two parts but will permit rotary movement of one relatively to the other.

While as before stated this form of hinge joint is especially well adapted for lockets and other articles of jewelry having a hinge joint, the invention is capable of a much wider application and hence, I do not limit the use of my invention to lockets and similar articles, but, Having described my invention, I claim:

1. In a hinge joint, the combination with two members to be hinged together, of a pintle consisting of two parts having a swivel connection one with the other, one part of the pintle being secured to one member and the other part to the other member.

2. In a hinge joint, the combination with two members to be hinged together, each member having a groove formed therein, said grooves when opposed to each other forming a bore, of a pintle formed of two parts having a swivel connection one with the other, said pintle fitting in said bore, and means for securing one part of the pintle to one member and the other part to the other member.

3. The combination with two halves of a locket each having a transverse groove near its edge and said grooves together forming a semi-cylindrical bore when the two halves are in contact face to face, of a pintle fitted in said bore and consisting of two parts having a swivel connection one with the other, and means for securing one part of the pintle to one half of the locket and the other part to the other half.

4. The combination with two halves of a locket each having a transverse groove near its edge and said grooves together forming a semicylindrical bore when the two halves are in contact face to face, of a pintle fitted in said bore and consisting of two parts one having a threaded bore and the other a reduced and threaded end portion to fit said bore, and means for securing one part of said pintle to one-half of the locket and the other part to the other half.

In witness whereof, I have signed my name to the foregoing specification in the presence of two subscribing witnesses.

EDWARD MORRIS.

Witnesses:
JOSEPH F. O'BRIEN,
ROSE V. FINN.